United States Patent
Dienhart et al.

(10) Patent No.: US 6,588,223 B2
(45) Date of Patent: Jul. 8, 2003

(54) OPTIMIZED $CO_2$ OPERATED AIR-CONDITIONING SYSTEM

(75) Inventors: Bernd Dienhart, Köln (DE); Hans-Joachim Krauss, Stuttgart (DE); Hagen Mittelstrass, Bondorf (DE); Karl-Heinz Staffa, Stuttgart (DE); Christoph Walter, Stuttgart (DE); Jürgen Fischer, Pleidelsheim (DE); Michael Katzenberger, Brackenheim (DE); Karl Lochmahr, Vaihingen (DE)

(73) Assignee: Visteon Global Technologies, Inc., Dearborn, MI (US)

( * ) Notice: Subject to any disclaimer, the term of this patent is extended or adjusted under 35 U.S.C. 154(b) by 18 days.

(21) Appl. No.: 10/217,784

(22) Filed: Aug. 13, 2002

(65) Prior Publication Data

US 2003/0000244 A1 Jan. 2, 2003

(Under 37 CFR 1.47)

Related U.S. Application Data

(63) Continuation of application No. 09/527,977, filed on Mar. 17, 2000, now abandoned.

(30) Foreign Application Priority Data

Jul. 20, 1998 (DE) .......................... 198 32 480

(51) Int. Cl.⁷ .............................. F25B 1/00; F25B 43/00
(52) U.S. Cl. ............................ 62/228.3; 62/229; 62/511
(58) Field of Search ................................ 62/228.3, 229, 62/228.5, 513, 511, 113, 244, 503

(56) References Cited

U.S. PATENT DOCUMENTS

| | | | | |
|---|---|---|---|---|
| 3,786,651 A | * | 1/1974 | Eschbaugh et al. | 62/222 |
| 5,245,836 A | * | 9/1993 | Lorentzen et al. | 62/174 |
| 5,685,160 A | * | 11/1997 | Abersfelder et al. | 62/114 |
| 5,694,783 A | * | 12/1997 | Bartlett | 62/211 |
| 6,105,386 A | * | 8/2000 | Kuroda et al. | 62/513 |
| 6,178,761 B1 | * | 1/2001 | Karl | 62/159 |

FOREIGN PATENT DOCUMENTS

EP         0915306 A2  *  5/1998 ............. F25B/9/00

* cited by examiner

*Primary Examiner*—Denise L. Esquivel
*Assistant Examiner*—Marc Norman
(74) *Attorney, Agent, or Firm*—Scott M. Confer

(57) ABSTRACT

An optimized $CO_2$ air-conditioning system for a vehicle has individual components designed and/or matched to one another in such a way that if the high pressures in the high-pressure section deviate by up to ±30% from the optimum high pressures, the associated optimum performance figures are reduced by no more than 20%. The individual components include a controllable compressor, a gas cooler, an internal heat exchanger, an evaporator and an accumulator. As a result, a fixed throttle expansion member can be used between the high-pressure and low-pressure sections of the system.

5 Claims, 3 Drawing Sheets

OPTIMIZED CO₂ OPERATED AIR-CONDITIONING SYSTEM

CROSS-REFERENCE TO RELATED APPLICATION

This application is a continuation of U.S. patent application Ser. No. 09/527,977, filed Mar. 17, 2000, now abandoned, hereby incorporated herein by reference.

FIELD OF THE INVENTION

The present invention relates to an air-conditioning system that can be operated with $CO_2$ for a vehicle. The system has a high-pressure section that is connected to the pressure output of a compressor and includes a gas cooler and a first branch of an internal heat exchanger, a low-pressure section that is connected to the suction inlet of the compressor and includes an evaporator, an accumulator and a second branch of the internal heat exchanger, and an expansion member connecting the high-pressure section to the low-pressure section, with optimum performance figures being assigned to optimum high pressures in the high-pressure section.

BACKGROUND OF THE INVENTION

In air-conditioning systems and, of course, also in air-conditioning systems operated with $CO_2$, the cooling performance to be supplied depends on the ambient temperature. The aim in practice is to operate with the most optimum performance figures possible, that is to say the ratio of the cooling performance to the drive power. It is known that the respectively optimum performance figures are in each case assigned to an optimum high pressure, that is to say are achieved at a high pressure that is optimum for the optimum performance figure. It has therefore become known to control the respectively optimum high pressures by means of a controllable expansion valve. The aim here is to move to the optimum high pressures for the respectively optimum performance figures as accurately as possible. This requires a high cost outlay in relation to the adjustable expansion valve, in relation to the high-pressure sensors needed and in relation to the design of the control system overall.

The increased complexity of air-conditioning systems operated with $CO_2$ for the additional internal heat exchanger and for the high-pressure regulation by means of an expansion valve, which are not necessary in the case of air-conditioning systems operated with other refrigerants, leads to the air-conditioning systems operated with $CO_2$ being made considerably more expensive. Although $CO_2$ as a refrigerant is significantly more environmentally friendly than other refrigerants and also offers other advantages, and although the performance of air-conditioning systems operated with $CO_2$ is at least equivalent, even if not superior to, the performance of air-conditioning systems operated with other refrigerants, the higher price places practical use at risk.

SUMMARY OF THE INVENTION

The present invention is based on the object of providing an air-conditioning system that can be operated with $CO_2$ of the type described above which permits a simplified construction and therefore a price reduction.

This object is achieved by the individual components being designed and/or matched to one another in such a way that if the high pressures deviate by up to ±30% from the optimum high pressures, the associated optimum performance figures are reduced by no more than 20%.

Trials have shown that it is possible to design an air-conditioning system in this way, so that a satisfactory cooling performance with a satisfactory performance figure is achieved, without complicated high-pressure regulation being necessary. It is then possible to provide significantly simplified regulation of the high pressure which, for example, operates with larger graduations. Under certain circumstances, it is even possible to manage with a single fixed throttle, that is to say to dispense completely with regulation of the high pressure.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
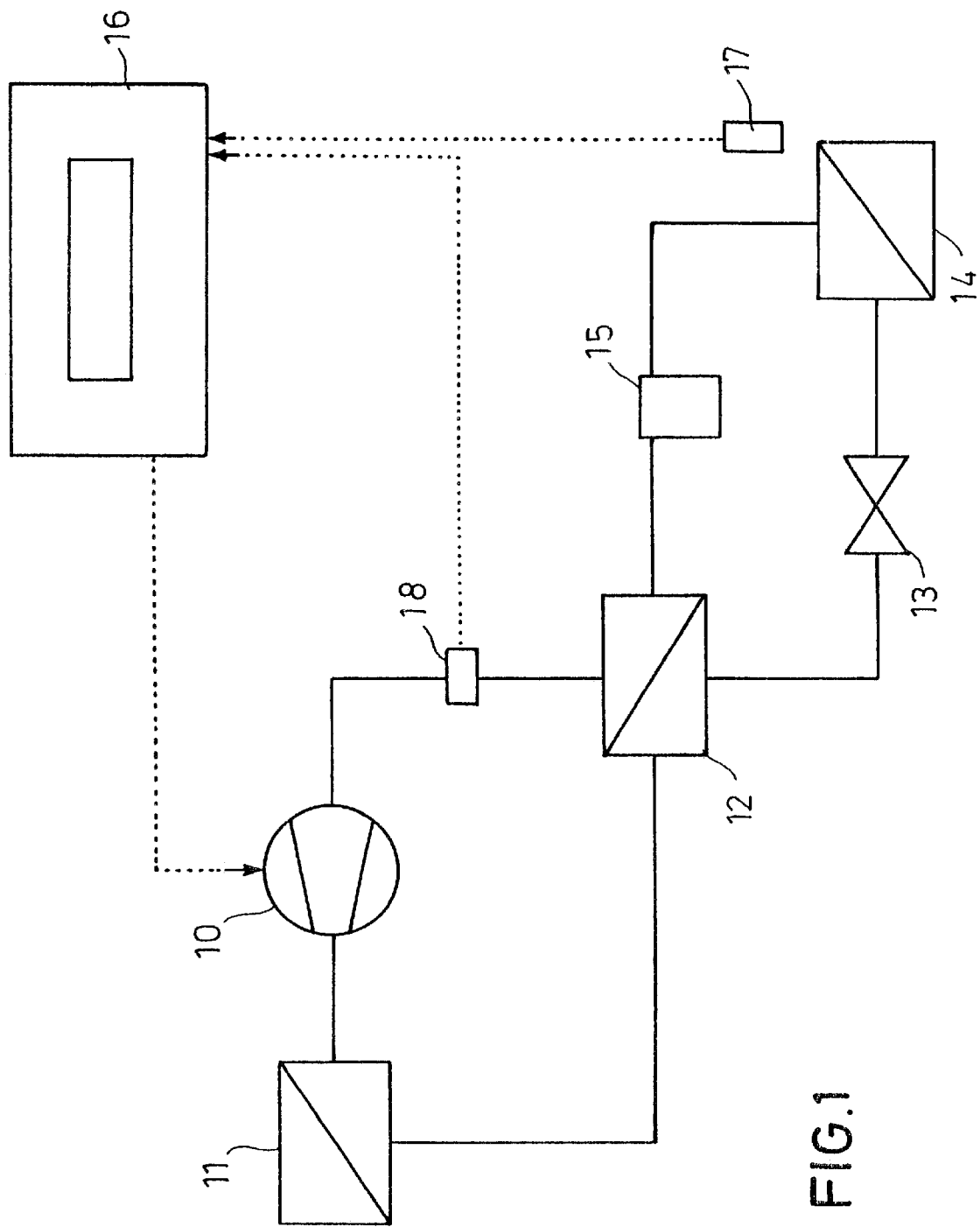
FIG. 1 is a schematic diagram of an air-conditioning system according to the present invention that can be operated with $CO_2$ as refrigerant.

The air-conditioning system illustrated in FIG. 1 includes a controllable compressor 10 that has an isentropic efficiency of at least 0.6 and a volumetric efficiency of likewise at least 0.6. The regulation of the compressor 10 can be carried out by switching it on and off, by means of internal adjustment or by adjusting the stroke. The high-pressure outlet of the compressor 10 is connected to a high-pressure section, in which there is a gas cooler 11. The gas cooler 11 has a thermal efficacy of at least 0.7.

Also arranged in the high-pressure section is a branch of an internal heat exchanger 12. From the internal heat exchanger 12, which has a thermal efficacy of at least 0.4, the $CO_2$, which is under high pressure, passes to an expansion member 13, which expands the $CO_2$ from high pressures up to about 12 MPa or even 14 MPa to pressures of 3.5 MPa to 5.0 MPa. The expanded $CO_2$ then flows into a low-pressure section to an evaporator 14, through an accumulator 15 and then through a second branch of the internal heat exchanger 12, to the suction connector of the compressor 10. The evaporator 14 has a thermal efficacy of at least 0.7. The accumulator 15 has a volume of more than 40 cm³. The lines or hoses of the high-pressure section have a diameter of about 2 mm to 8 mm. The lines or hoses of the low-pressure section have a somewhat larger diameter, which can be from 3 mm to 10 mm. The refrigerant content of the entire air-conditioning system is less than 600 g of $CO_2$.

Associated with the air-conditioning system is a control unit 16, into which the signals from a temperature sensor 17 are input, which is assigned to the evaporator 14 on the outlet side of the cooled air. Also provided is a pressure sensor 18, which registers the suction pressure of the compressor 10 and inputs it into the control unit 16. In addition, the desired cooling of the air flowing through the evaporator 14 and the temperature of the external environment are input into the control unit 16. The compressor 10 is regulated on the basis of these values.

Figure 2:
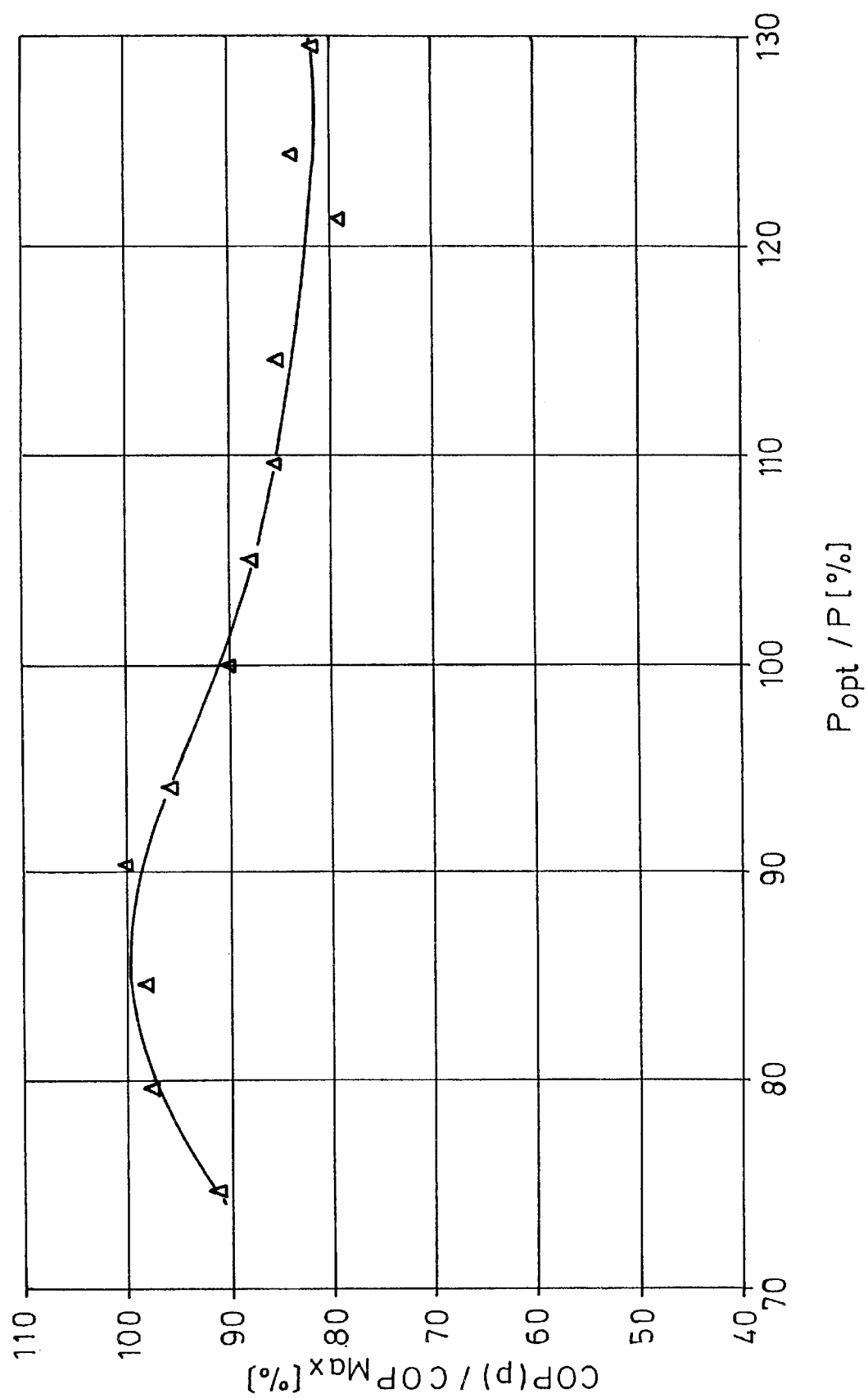
FIG. 2 is a plot that illustrates the deviations of the performance figure from the optimum or maximum performance figure as a function of high-pressure deviations.

The individual components of the air-conditioning system are designed and matched to one another in such a way that if the high pressure deviates from the optimum high pressure, the performance figures change in accordance with the curve shown in FIG. 2, that is to say they remain in a relatively narrow bandwidth. The value of the optimum high pressure ($P_{opt}$) divided by the value of the actual high pressure (P) expressed as a percentage is plotted on the X-axis while the actual performance figure (COP) divided by the optimum or maximum performance figure ($COP_{max}$) expressed as a percentage is plotted on the Y-axis. In the event of deviations in the high pressures of up to ±30% from the optimum high pressure ($P_{opt}$) associated with the optimum or maximum performance figure ($COP_{max}$), the performance figure COP is reduced by no more than 20%.

It must not necessarily be expected that the curve of the performance figure COP against the high pressure P corresponding to FIG. 2 and having only a low bandwidth of deviations will result in this or a similar way if the specified minimum values are implemented for the functions of all the components in the air-conditioning system. Instead, by means of trials it is necessary to determine whether for one or more components, higher values than the minimum values have to be implemented, if appropriate, in order to match the components to one another and to design the air-conditioning system in such a way that the deviations of the performance figure COP from the maximum or optimum performance figure $COP_{max}$ remain within the desired bandwidth.

Figure 3:
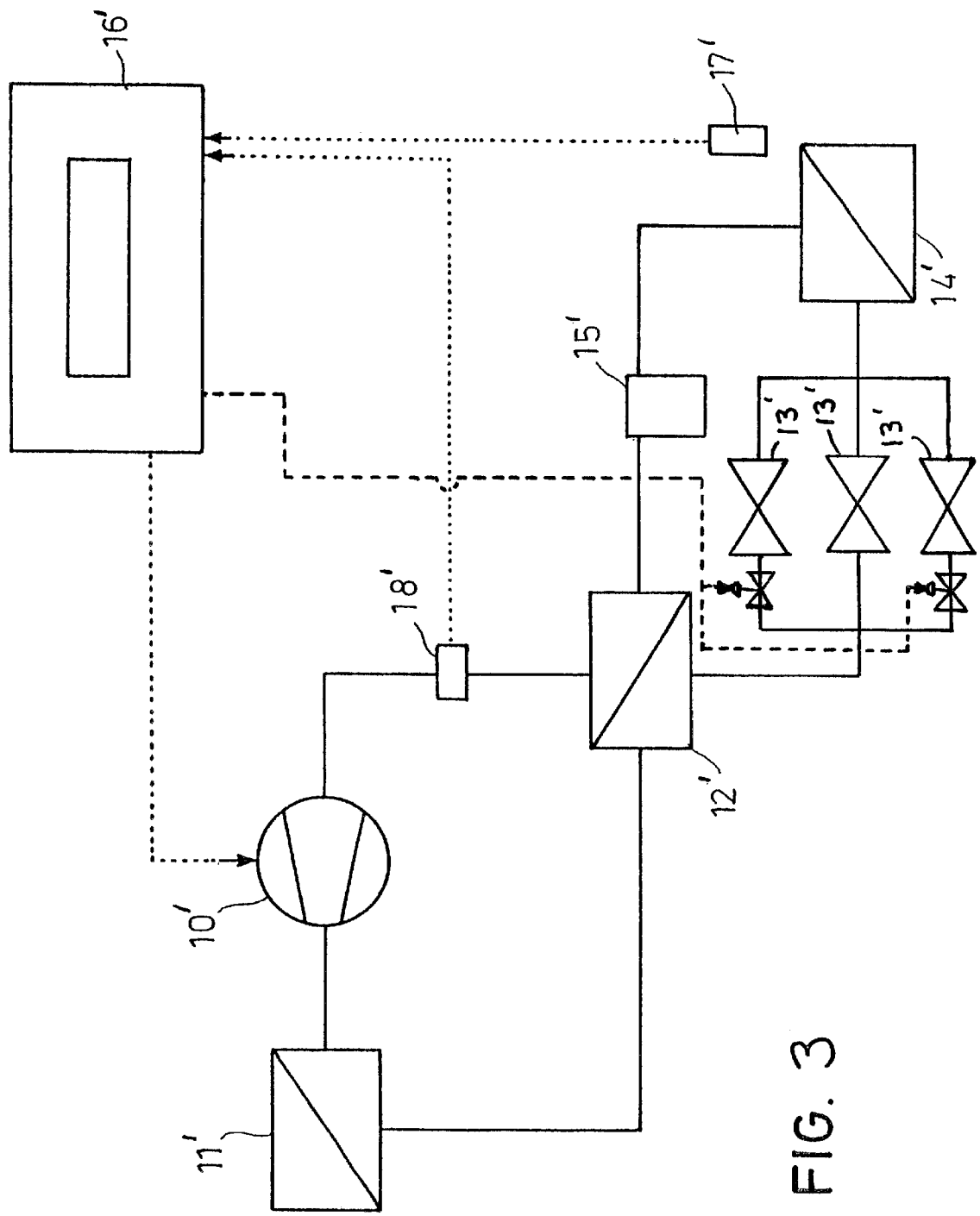
FIG. 3 is a schematic diagram of an alternate embodiment of the air conditioning system of FIG. 1 showing more than one expansion member or fixed throttle.

If an air-conditioning system is designed in such a way that the dependence of the performance figure COP on the pressure P lies in a range similar to FIG. 2, it is then possible to design the expansion member 13 as a fixed throttle, that is to dispense completely with high-pressure regulation. In this case, a fixed throttle whose throttle opening is such that the high pressure is limited to a maximum of 14 MPa or, if appropriate, even to lower values, for example 12 MPa, is sufficient. However, provision can also be made for a number of fixed throttles or expansion members 13 to be connected in parallel, as illustrated in FIG. 3. The fixed throttles can alternatively be brought into use individually or, if appropriate, also jointly and, in so doing, in each case limit the high pressure to a specific high-pressure range. The activation of these fixed throttles is then carried out by the controller 16, for example on the basis of the high pressure or suction pressure and/or the temperature of the environment. It is likewise possible to provide a simplified expansion valve, whose throttle opening can be varied only in stages, for example. In this case, only a suitable high-pressure range would be selected, without providing true regulation of the high pressure. In this way, a reduction in the manufacturing costs can be realized.

Overall, the invention makes it possible to simplify, at least significantly, the complicated high-pressure regulation, previously held to be necessary by. those skilled in the art, by means of a controllable expansion valve and a high-pressure sensor, or even to dispense entirely with this regulation.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An air-conditioning system operated with $CO_2$ refrigerant comprising:
    a compressor having pressure output and a suction inlet;
    a high-pressure section connected to said pressure output of said compressor and including a gas cooler and a first branch of an internal heat exchanger connected in series;
    a low-pressure section connected to said suction inlet of said compressor and including an evaporator, an accumulator and a second branch of said internal heat exchanger connected in series;
    an expansion member connecting said high-pressure section to said low-pressure section;
    a predetermined quantity of $CO_2$ refrigerant flowing in the system; and
    a control unit having an output connected to said compressor for controlling said pressure output of said compressor in response to an input signal at an input connected to a sensor, said sensor being at least one of a pressure sensor registering a pressure of said suction inlet and a temperature sensor registering a temperature of cooled air exhausted from said evaporator.

2. The air-conditioning system according to claim 1 wherein said control unit receives a signal from a temperature sensor registering desired cooling of air flowing through said evaporator and a signal from a temperature sensor registering a temperature of ambient air.

3. An air-conditioning system operated with $CO_2$ refrigerant comprising:
    a compressor having a pressure output and a suction inlet;
    a high-pressure section connected to said pressure output of said compressor and including a gas cooler and a first branch of an internal heat exchanger connected in series;
    a low-pressure section connected to said suction inlet of said compressor and including an evaporator, an accumulator and a second branch of said internal heat exchanger connected in series;
    a plurality of fixed expansion members connected in parallel between said high-pressure section and said low-pressure section; and
    a predetermined quantity of $CO_2$ refrigerant flowing in the system.

4. The air-conditioning system according to claim 3 including a control unit for selectively controlling flow through at least one of said plurality of expansion members.

5. An air-conditioning system operated with $CO_2$ refrigerant comprising:
    a compressor having a pressure output and a suction inlet;
    a high-pressure section connected to said pressure output of said compressor and including a gas cooler and a first branch of an internal heat exchanger connected in series;
    a low-pressure section connected to said suction inlet of said compressor and including an evaporator, an accumulator and a second branch of said internal heat exchanger connected in series;
    a fixed expansion member connecting said high-pressure section to said low-pressure section;
    a predetermined quantity of $CO_2$ refrigerant flowing in the system; and
    a control unit having an output connected to said compressor for controlling said pressure output of said compressor in response to an input signal at an input connected to a sensor, said sensor being at least one of a pressure sensor registering a pressure of said suction inlet and a temperature sensor registering a temperature of cooled air exhausted from said evaporator.

* * * * *